(12) United States Patent
Shila et al.

(10) Patent No.: US 11,568,694 B2
(45) Date of Patent: Jan. 31, 2023

(54) REALESTATE AS TRADABLE DIGITAL ASSETS THROUGH BLOCKCHAIN INTEGRATION

(71) Applicant: CARRIER CORPORATION, Palm Beach Gardens, FL (US)

(72) Inventors: Devu Manikantan Shila, West Hartford, CT (US); Adriaan Larmuseau, Shanghai (CN); Adam Kuenzi, Silverton, OR (US); Yuri Novozhenets, Pittsford, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/058,853

(22) PCT Filed: Dec. 5, 2019

(86) PCT No.: PCT/US2019/064727
§ 371 (c)(1),
(2) Date: Nov. 25, 2020

(87) PCT Pub. No.: WO2020/118078
PCT Pub. Date: Jun. 11, 2020

(65) Prior Publication Data
US 2021/0287465 A1 Sep. 16, 2021

(30) Foreign Application Priority Data
Dec. 6, 2018 (CN) .......................... 201811488100.8

(51) Int. Cl.
*G07C 9/00* (2020.01)
*G06F 16/27* (2019.01)
(Continued)

(52) U.S. Cl.
CPC ......... *G07C 9/00658* (2013.01); *G06F 16/27* (2019.01); *G06F 21/35* (2013.01);
(Continued)

(58) Field of Classification Search
CPC .. G07C 9/00658; G07C 9/00309; G07C 9/28; G06F 16/27; G06F 21/35; H04L 2209/38; E05B 67/02; E05B 19/0005
See application file for complete search history.

(56) References Cited

U.S. PATENT DOCUMENTS 10,745,943 B1 * 8/2020 Jonak ...................... E05B 67/02
10,833,843 B1 * 11/2020 Vijayvergia .......... H04L 9/3242
2018/0191714 A1 7/2018 Jentzsch et al.

FOREIGN PATENT DOCUMENTS

KR 101875725 B1 7/2018

OTHER PUBLICATIONS

Andersen, M. et al. "WAVE: A Decentralized Authorization System for IoT via Blockchain Smart Contracts", Electrical Engineering and Computer Sciences University of California at Berkeley, Dec. 29, 2017. 18 Pages.
(Continued)

*Primary Examiner* — Vernal U Brown
(74) *Attorney, Agent, or Firm* — Cantor Colburn LLP (57) ABSTRACT

An assignable realestate system includes a processor, a storage medium, a wireless device including a digital key, a lock assembly for access to realestate, a data file, and a blockchain application. The data file is stored in the medium, and includes a plurality of linked blocks. Each block includes a respective asset transaction data of a plurality of asset transaction data with each data being time stamped. The blockchain application is stored in the medium and executed by the processor. The blockchain application is configured to apply the data file to determine a current asset
(Continued)

transaction data of the plurality of asset transaction data and output an authorization signal to the lock assembly associated with the device for access to the realestate.

5 Claims, 6 Drawing Sheets

(51) Int. Cl.
  *G06F 21/35* (2013.01)
  *H04L 9/32* (2006.01)
  *H04L 9/00* (2022.01)
(52) U.S. Cl.
  CPC ........ *G07C 9/00904* (2013.01); *H04L 9/3239* (2013.01); *H04L 9/50* (2022.05)

(56) References Cited

OTHER PUBLICATIONS

Anonymous: Smart Property—Bitcoin Wiki, Jul. 11, 2015, Retrieved from the Internet: URL: https://en.bitcoin.it/w/index.php?title=Smart_Property&oldid=57450 [retrieved on Jan. 18, 2016], 4 Pages.
BCG—Seven Possible Killer Apps for Blockchain And Digital Tokens. Retrieved: Aug. 27, 2018 from https://www.bcg.com/blockchain/sevenpossiblekillerappsforblockchainanddigitaltokens.html. 7 Pages.
Blockchain-based Door Lock Design. PopulStay. Retrieved: Aug. 27, 2018 from https://www.populstay.com/. 11 Pages.
Create a private Ethereum blockchain with IoT devices (1/6). Chainskills. Retrieved: Aug. 27, 2018 from http://chainskills.com/2017/02/24/createaprivateethereumblockchainwithiotdevices16/. 24 Pages.
Han, Donhee & Kim, Hongjin & Jang, Juwook. (2017). Blockchain based smart door lock system. 1165-1167. 10.1109/ICTC.2017.8190886. 3 Pages.
International Search Report for International Application No. PCT/US2019/064727; Date of Completion: Mar. 10, 2020; dated Mar. 17, 2020; 4 Pages.
IoT Blockchain—Complexity Labs. Retrieved: Aug. 27, 2018 from https://complexitylabs.io/iotblockchain/. 3 Pages.
IoT Meets NFC In Zerado's New Blockchain Prototype—CoinDesk. Retrieved: Aug. 27, 2018 from https://www.coindesk.com/iotmeetsnfcinzeradosnewblockchainprototype/. 3 Pages.
OkeyDokey—Revolutionising The Property Rental System? Retrieved: Aug. 27, 2018 from https://medium.com/okeydokeyproject/okeydokeyrevolutionisingthepropertyrentalsystem2d5c416bb409. 4 Pages.
Safe4 enhances its Smart Home Offering with Smart Door Locks from Yale. Retrieved: Aug. 27, 2018 from https://www.chipin.com/safe4yalesmartdoorlock/. 3 Pages.
Smart Contracts—What is a Smart Contract? Auto enforceable Code Blockchain. Retrieved: Aug. 27, 2018 from https://blockchainhub.net/smartcontracts/. 7 Pages.
Top use cases for Blockchain in Hospitality. Mindspace. Retrieved: Sep. 9, 2018 from https://www.mindtree.com/about/resources/top-use-cases-blockchain-hospitality-0. 4 Pages.
Toyota Prototypes Ethereum Blockchain Based Car Sharing Uber Alternative. Retrieved: Aug. 27, 2018 from https://www.trustnodes.com/2017/05/28/toyotaprototypesethereumblockchainbasedcarsharinguberalternative. 5 Pages.
VIONEX—Blockchain-based SmartHome System. Retrieved: Aug. 27, 2018 from https://bitscreener.com/pressrelease/vionexblockchainbasedsmarthomesystem. 4 Pages.
Written Opinion of the International Searching Authority for International Application No. PCT/US2019/064727; International Filing Date: Dec. 5, 2019; dated Mar. 17, 2020; 10 Pages.

* cited by examiner

REALESTATE AS TRADABLE DIGITAL ASSETS THROUGH BLOCKCHAIN INTEGRATION

CROSS-REFERENCE TO RELATED APPLICATIONS

This application is a Non-Provisional Application of PCT/US2019/064727 filed Dec. 5, 2019, which claims the benefit of Chinese Application No. 201811488100.8 filed Dec. 6, 2018, the disclosure of which is incorporated herein by reference in its entirety.

BACKGROUND

The present disclosure relates to an assignable realestate system, and more particularly, to an assignable realestate asset system utilizing blockchain technology.

Smart lock systems may include one, or more smart locks, that may be managed by a central management system. Virtual, or digital, keys (i.e., keyless unlocking mechanisms) may be applied to operate specific locks as generally granted by the management and/or authentication system. Unfortunately, some smart lock applications require high security standards and confidence that the lock system is not being manipulated thereby placing any security, or historical records, in question.

BRIEF DESCRIPTION

A method of operating a realestate system according to one, non-limiting, exemplary embodiment includes initiating the creation of grant transaction data by a human being. The grant transaction data is then recorded as part of a blockchain. A digital key indicative of the grant transaction data is assigned to a mobile device associated with the human being. The digital key is then applied to a lock assembly. A blockchain application is executed by a processor of the lock assembly to verify the digital key. Once verified, the lock assembly is operated.

An assignable realestate system according to another, non-limiting, embodiment includes at least one processor; at least one storage medium; a mobile wireless device including a digital key; a lock assembly adapted to control access to a realestate; a data file stored in the at least one storage medium including a plurality of linked blocks, wherein each one of at least a portion of the plurality of linked blocks include a respective asset transaction data of a plurality of asset transaction data with each one of the plurality of asset transaction data being time stamped; and a blockchain application stored in the at least one storage medium and executed by the at least one processor, wherein the blockchain application is configured to apply the data file to determine a current asset transaction data of the plurality of asset transaction data and output an authorization signal to the lock assembly associated with the mobile wireless device for access to the realestate based on the current asset transaction data.

In accordance with the foregoing embodiment, the digital key is a wireless signal sent from the mobile wireless device to the lock assembly, the wireless signal including a mobile wireless device address, and the lock assembly being configured to send an authorization request signal including the mobile wireless device address to the blockchain application for authorization verification.

In the alternative or additionally thereto, in the foregoing embodiment, the system includes an assignment application stored in the at least one storage medium and executed by the at least one processor, the assignment application being configured to accept authorization commands from an administrator and output an asset data signal to the blockchain application for development of the current asset transaction data.

In the alternative or additionally thereto, in the foregoing embodiment, the asset data signal includes a mobile wireless device address.

In the alternative or additionally thereto, in the foregoing embodiment, the wireless mobile device includes a key application for the generation of the digital key.

In the alternative or additionally thereto, in the foregoing embodiment, the digital key is a wireless signal transmitted from the mobile wireless device to the lock assembly, and the wireless signal includes the mobile wireless device address.

In the alternative or additionally thereto, in the foregoing embodiment, the lock assembly is configured to send an authorization request signal that includes the mobile wireless device address to the blockchain application for authorization verification.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
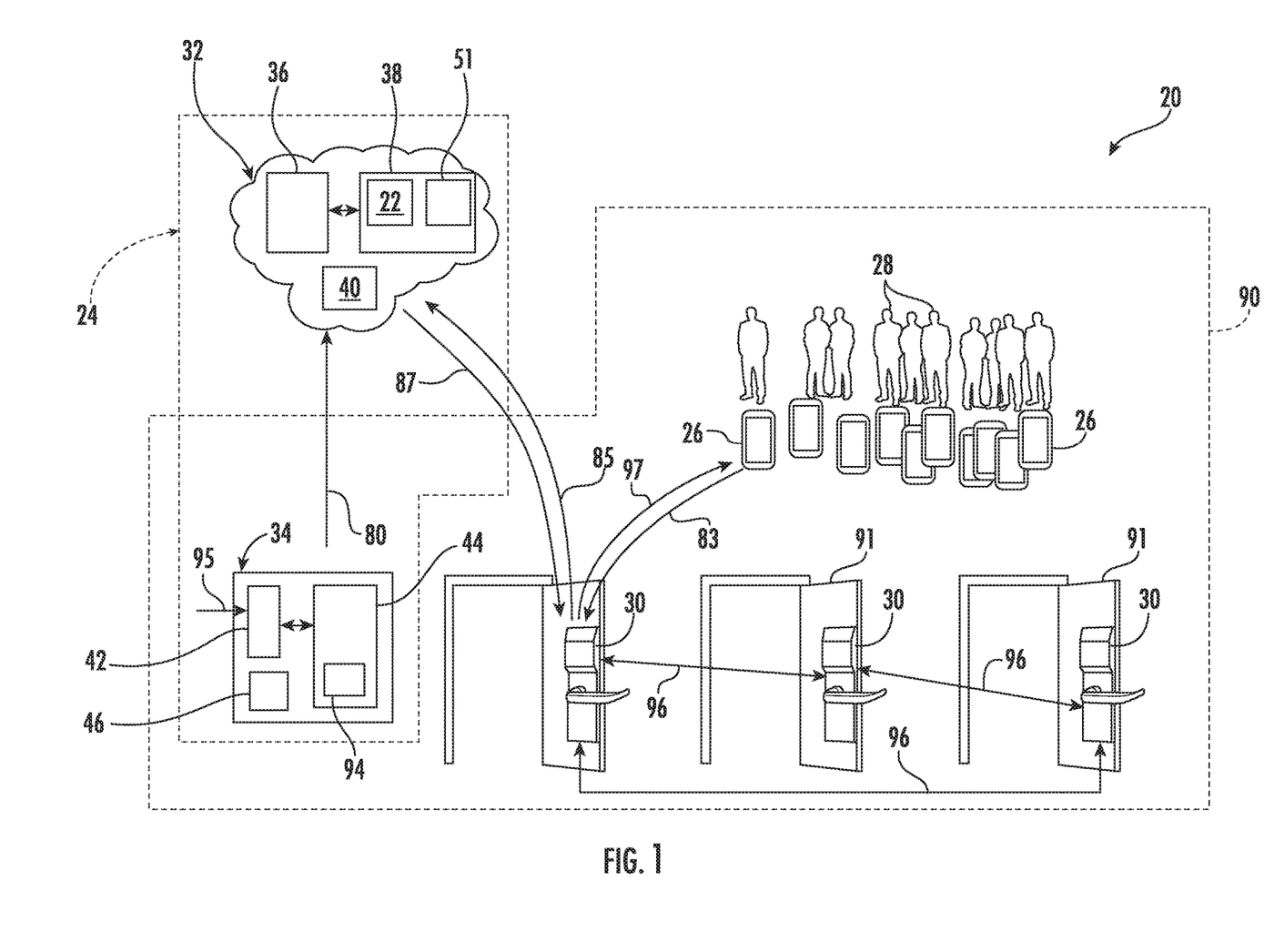
FIG. 1 is a schematic of a system as one, non-limiting, exemplary embodiment of the present disclosure.

Referring to FIG. 1, a system 20 (e.g., smart lock system) may include, and is supported by, a blockchain application 22 to enhance security and provide historical records (i.e., transactions) with a high degree of confidence. The system 20 may include a control arrangement 24, a plurality of digital, or virtual, keys 26 that may be carried by respective human beings 28, and a plurality of smart lock assemblies 30. The term "smart" in smart lock assemblies refer to an electronic device that may generally be connected to other devices or networks via various wireless protocols such as Bluetooth, NFC. Wi-Fi, LiFi, 3G and others. The smart lock assemblies 30 may also operate, to a degree, interactively and autonomously. Examples of the digital key 26, may be an access card with a magnetic strip, a smart phone with a preloaded lock application, tablets, smart bands, and others. Applications of use regarding the smart lock assemblies 28 may be human access doors (e.g., hotel room doors), vaults, safes, mailboxes, keyboxes, padlocks, Bluetooth modules, and others.

The control arrangement 24 may include a server 32 and an administrative or management controller 34 that may be local (e.g., located within a hotel wherein the lock assemblies 30 are an integral part of hotel room doors). The server 32 may be run remotely or locally, and/or may be cloud or web based. In one example, the server 32 may not be in direct communication with the local controller 34. It is further contemplated and understood that the controller 34 may be an integral part of the server 32 (i.e., may share the same processor and computer readable storage medium).

Figure 2:
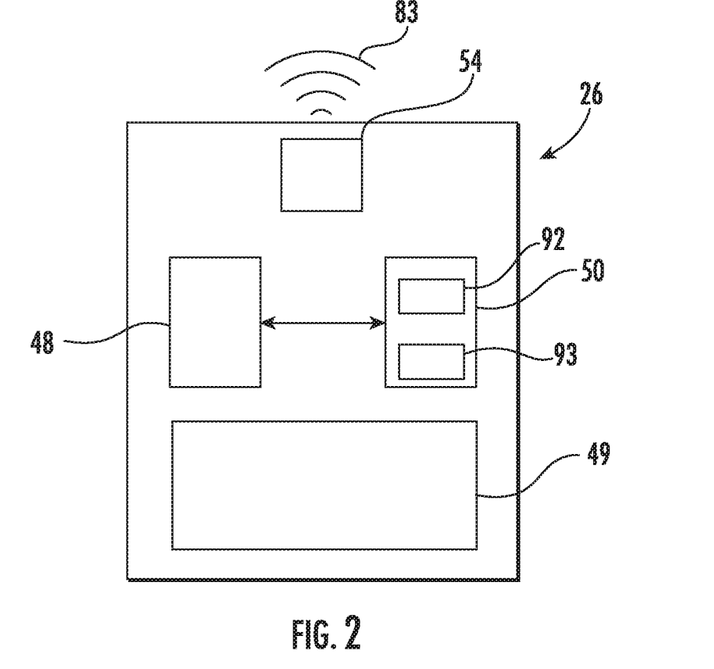
FIG. 2 is a schematic of a digital key of the system.

The remote server 32 may include an electronic processor 36 (e.g., microprocessor), an electronic storage medium 38 that may be computer readable and writeable, and a transceiver 40 for wireless communications. In one embodiment, the blockchain application 22 may be stored in the storage medium 38 and, at least in-part, executed by the processor 36 of the server 32. The controller 34 may include a computing processor 42 (e.g., microprocessor), an electronic storage medium 44 that may be computer readable and writeable, and in some applications, a transceiver 46 for wireless communications. Referring to FIG. 2, each one of the digital keys 26 may include an electronic processor 48 (e.g., microprocessor), an electronic storage medium 50 that may be computer readable and writeable, a user interface 49, and a transceiver 54 for wireless communications.

Figure 3:
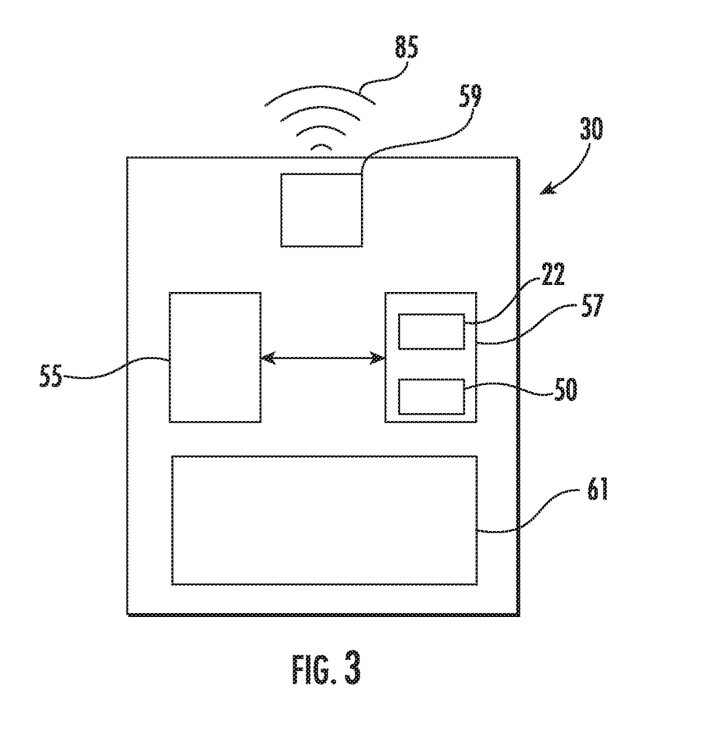
FIG. 3 is a schematic of a lock assembly of the system.

Referring to FIG. 3, the lock assembly 30 may be smart, and may include an electronic processor 55 (e.g., microprocessor), an electronic storage medium 57 that may be computer readable and writeable, a transceiver 59 for wireless communications, and a latch or lock mechanism 61. In one embodiment, the transceiver 59 is configured to receive signal(s) from the digital key 26 (e.g., mobile device) and transmit signals to the controller 34 and/or the server 32.

The term "blockchain" refers to a list of records (i.e., called blocks) capable of growth, and linked using cryptography. Each block may contain a cryptographic hash of the previous block, a timestamp, and transaction data. By design, blockchains are resistant to modification of the transaction data, and is generally an open distributed ledger that can record transactions between parties, and/or entities, efficiently and in a verifiable and permanent way. When applied as a distributed ledger, the blockchain may be managed by a peer-to-peer network collectively adhering to a protocol for inter-node communication and validating new blocks (i.e., the blockchain application 22). Once recorded, the data in any given block cannot be changed retroactively without a change to all subsequent blocks. Such a change to all subsequent blocks may require a consensus of the network majority.

Figure 4:
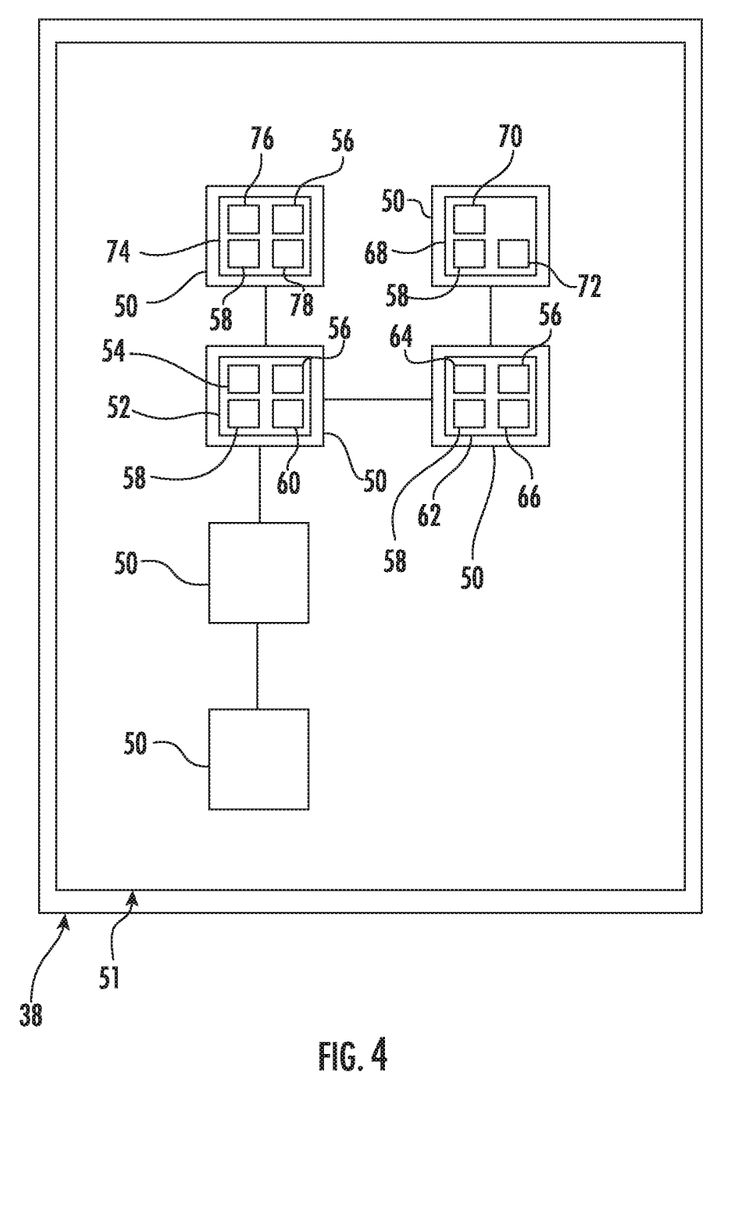
FIG. 4 is a schematic of a data file used by a blockchain application of the system.

Referring to FIG. 4, the storage medium 38 of the server 32 may also store a plurality of linked blocks 50 (i.e., the blockchain) as part of a data file 51 accessible and applied by the blockchain application 22. Each block 50 includes one of a variety of transaction data types. For example, grant or asset transaction data 52 (i.e., grant authorization) includes grant event 54 to a specific digital key 26 with regard to at least one lock assembly 30, a key or device address 56 indicative of the specific digital key 26, a lock address 58 indicative of the specific lock assembly 30, and a time stamp 60. The transaction data 52 may further include the name and personal information of the human being 28 assigned to the digital key 26.

In another embodiment, the grant transaction data 52 may include an identity that refers to the human being 28 assigned the digital key 26. In this embodiment, if the device address 56 matches the digital key 26, then the human being 28 may gain access.

In yet another embodiment, the digital key 26 may be a mobile device (e.g., smart phone), and may be configured to declare an identity to the lock assembly 30 (i.e., "I am identity xyz"). The blockchain application 22 may then search for recorded access right to "xyz" as part of the blockchain 50. In order to prove that this is really the person who is identified by "xyz," the lock assembly 30 may contact a service and verify the identity, or the mobile device 26 would verify the identity and certify the identity to the lock assembly 30. The lock assembly 30 may then verify the certificate. In all techniques, something is recorded on the blockchain 50 that the blockchain application 22 may check at the request of the lock assembly 30 to confirm access rights.

The grant transaction data 52 may be associated with a "smart contract" that, at least in-part, resides as part of the blockchain application 22. The grant transaction data 52 may be viewed as a "code" that is included as part of the blockchain 50. The grant transaction data 52 can be verified as being authentic and current, and can be downloaded to the processor 55 of the lock assembly 30 and utilized by the blockchain application 22 stored in the storage medium 57 of the lock assembly 30 during execution. The grant transaction data 52, or code, is protected by the blockchain 50, or blockchain application 22, so that it is not modifiable. The grant transaction data 52 may be, or may facilitate, a simple verification that an expected identity of the mobile device 26 (i.e., related to the human being 28 carrying the mobile device 26) is the recorded identity, and access time is within an access window, reservation date, time, or other pre-establish criteria executed by the blockchain application.

In one embodiment, and because the grant transaction data 52 resides in the blockchain 50, only the human being 28 who created the grant transaction data 52, or is assigned the associated key, can delete the grant transaction data 52, or add a new grant transaction data or code. The grant transaction data 52 is associated with the "smart contract" because the transaction data 52 may be executed, or applied in an execution, without requiring human intervention. The "smart contract" enables autonomous operation of the lock assemblies 30 and mobile devices 26. For example, when the human being 28 registers as an authorized person, the "smart contract" is invoked leading to the automatic sending of the digital keys and other credentials needed for the human being 28 to unlock the lock assembly 30.

An unlock transaction data 62, as one example of a transaction data type, may include an opening, or unlock, event 64 of a specific lock assembly 30, the specific lock address 58, the specific key address 56, and a time stamp 66 of the opening event 64. Locking transaction data 68 may include a closing, or locking, event 70 of the specific lock assembly 30, the specific lock address 58, and a time stamp 72 of the locking event 70. With regard to transaction data 68, the locking event 70 may occur automatically without use of a digital key 26. For example, a hotel room door that incorporates a lock assembly 30 may be biased toward a locked position, and once the door closes, the lock assembly 30 may be adapted to automatically lock.

In another example of a transaction data type, denied transaction data 74 includes an access deny event 76 to a specific lock assembly 30 utilizing a specific digital key 26, the key address 56 indicative of the specific digital key 26, the lock address 58 indicative of the specific lock assembly 30, and a time stamp 78. The transaction data 74 may further include the name and personal information of the human being 28 denied access via the digital key 26.

In yet another example, access removed transaction data 78 may include an access removal event 80, wherein a human being 28 (or the digital key 26 carried by the human being) is denied access to, or the ability to unlock, a specific lock assembly 30. The transaction data 78 may further include a key address 82, a lock address 84, and a time stamp 86. In one example, the key address 82 may be a wireless device address that generally transmits the digital key signal.

Referring to FIGS. 1-4, and in operation, an administrator at the local controller 34 of the control arrangement 24 may initiate an access grant signal 81 with regard to a specific key 26 and specific lock assembly 30. The access grant signal 81 may be received by the blockchain application 22. The application 22 may then create and link a block 50 indicative of the grant transaction data 52. With this grant authorization, the specific key 26 may now operate the specific lock assembly 30. In one embodiment, the access grant is not pre-stored by the lock assembly 30 and/or the key 26. Instead, the grant is stored as part of the data file 51 and is referred to by the lock assembly 30 and/or the key 26 upon initiation of the next transaction (e.g., an unlock event).

When the key 26 attempts to unlock the lock assembly 30 (see arrow 83 indicative of an actuation request signal or reading from the key), the lock assembly 30 may send an authorization request signal (see arrow 85) to the server 32. In one example, signal 85 may be sent from the lock assembly 30 via a network, and to the cloud server 332. The blockchain application 22 may then refer to the data file 51 to determine if the current block 50, or current relative block, confirms access grant (i.e., the grant transaction data 52). If yes, the blockchain application 22 effects an output by the server 32 as an access verification signal (see arrow 87) to the requesting lock assembly 30. Once received, the lock assembly 30 may reposition to an unlock state.

Figure 5:
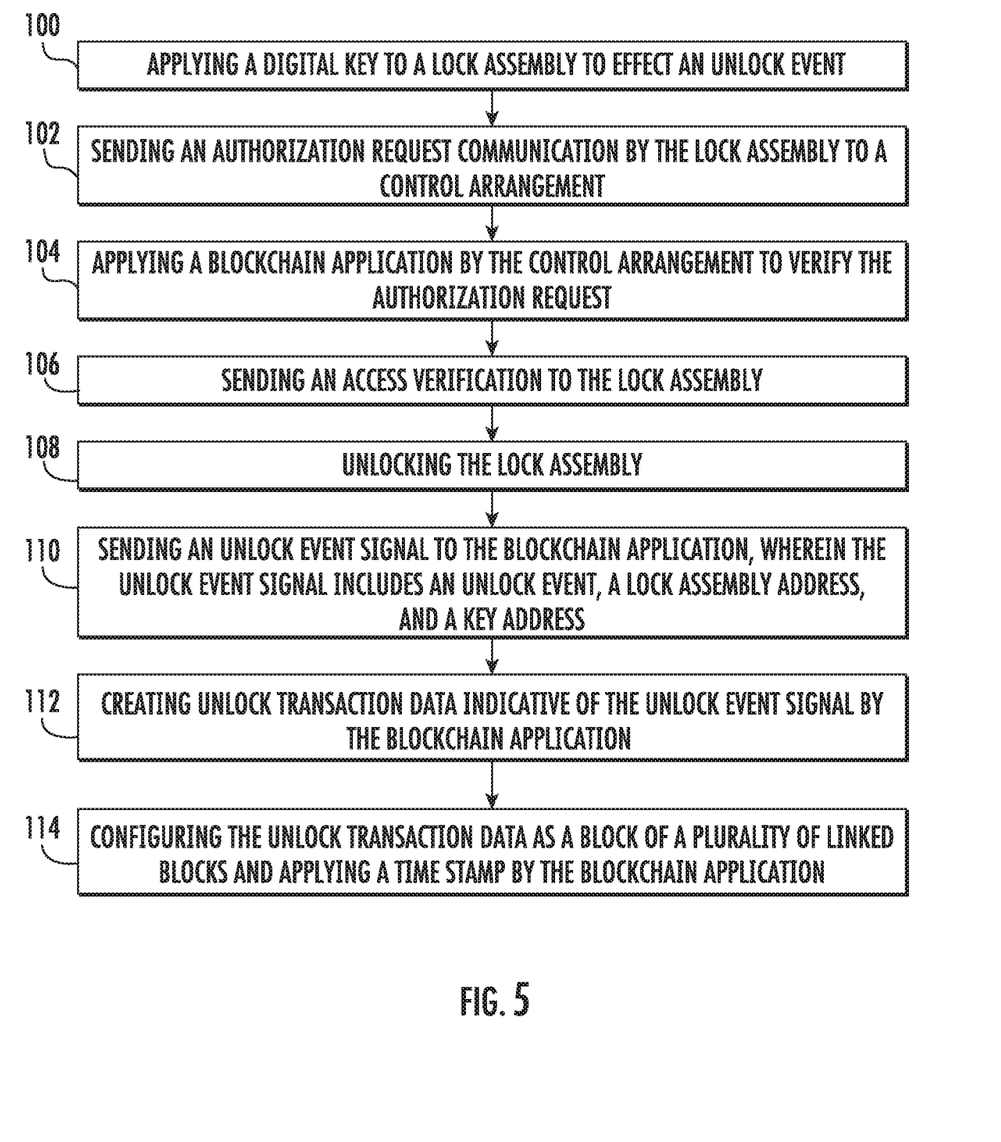
FIG. 5 is a flow chart illustrating a method of operating the system.

Referring to FIG. 5, a method of operating the system 20 is illustrated. At block 100, a digital key 26 is applied to a lock assembly 30 to effect an unlock event 64. At block 102 an authorization request communication, or signal, 85 is sent by the lock assembly 30 to the control arrangement 24. At block 104, the control arrangement 24 applies the blockchain application 22 to verify die authorization request. At block 106, the control arrangement 24 sends an access verification signal 87 to the lock assembly 30. At block 108, the lock assembly 30 unlocks.

At block 110, and after the lock assembly 30 unlocks, the lock assembly 30 may send an unlock event signal (see arrow 88 in FIG. 1) to the blockchain application 22. The unlock event signal 88 may include information pertaining to the unlock event, the associated lock address, and the associated key address. At block 112, the blockchain application 22 may then create unlock transaction data indicative of the unlock event signal. At block 114, the blockchain application 22 configures the unlock transaction data as a block of a plurality of blocks 50, and applies a time stamp to the block.

In another embodiment, the system 20 may be a transferable realestate asset system (i.e., an assignable realestate system) applied to realestate 90 (see FIG. 1). The realestate 90 may be hotel rooms, residential homes, and other dwellings. In this embodiment, the digital key 26 (see FIG. 2) is a mobile wireless device configured to wirelessly transmit an actuation request signal 83 that is generally a digital key signal or the digital key itself. The signal 83 may contain a wireless device address 92 preprogrammed and stored in the storage medium 49 along with a preprogrammed key application 93 executed by the processor 48 of the device 26 to generate the request signal 83.

In the present disclosure, the digital key, or signal 83, is not generally defined by a secretive sequence of bytes. Instead, the signal 83 is defined by the account that owns it (i.e., the wireless device address 92). This ownership of the digital key is determined through a distributed ledger of verified transactions that constitute a blockchain (i.e., the plurality of linked blocks 50).

As previously described, at least a portion of the plurality of linked blocks 50 may respectively contain a plurality of different asset transaction data 52 each with a different time stamp. The most current asset transaction data 52 is the effective or appropriate asset transaction data 52, and die only data capable of transferring die asset (i.e., realestate 90). More specifically, the human being 28 carrying and operating the mobile wireless device 26 associated with the current asset transaction data 52 is the only human being 28 accredited with the right to open a door 91 utilizing the lock assembly 30 (see FIG. 1). Any other asset transaction data contained in other blocks 52 with preceding time stamps is not the most current. That is, a different user of a different mobile device with a different address, and with a preceding time stamp, is not accredited access.

In one embodiment, the current asset transaction data 52 may be generated by an administrator from the administrative controller 34. An assignment application 94 may be stored in the storage medium 44 of the controller 34 and executed by the processor 42. The assignment application 94 receives authorization commands (see arrow 95) from the administrator. The command 95 may include the address 56 of the mobile device 26 and instructions to grant access. The application 94 may then effect the transmission, via transceiver 46, of the grant access signal 81 to the blockchain application 22 for development of the current asset transaction data 52.

Figure 6:
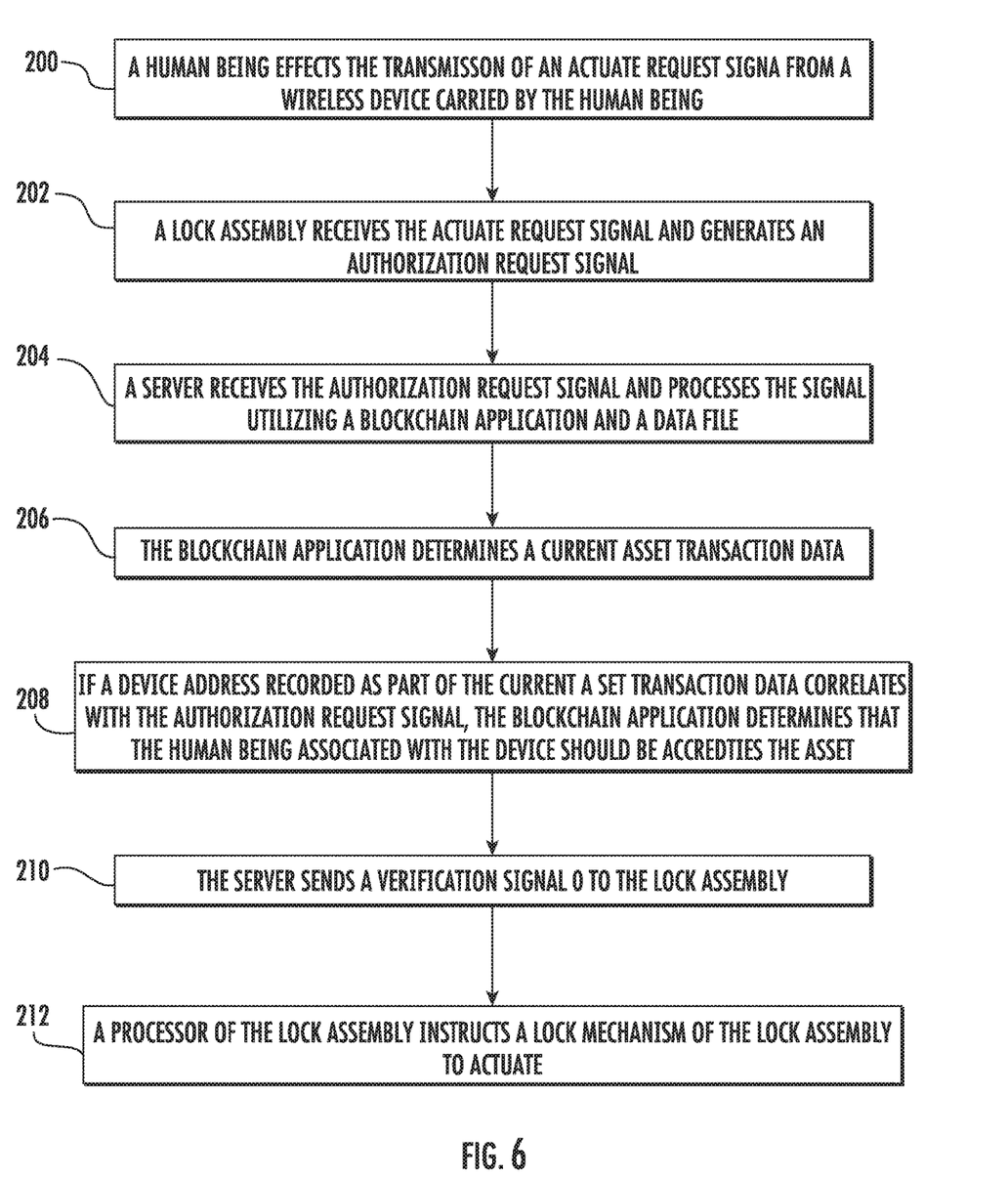
FIG. 6 is a flow chart illustrating a method of verifying a user of the system.

Referring to FIG. 6 and in operation of the transferrable realestate asset system 20, and at block 200, a human being 28 may effect the transmission of an actuate request signal 83 from a transceiver 54 of a wireless device 26 carried by a human being 28. At block 202, the transceiver 59 of the lock assembly 30 receives signal 83, then the processor 55 processes the signal 83 and generates an authorization request signal 85. The transceiver 59 transmits the signal 85 to server 32. If the server 32 is a cloud server, transmission of signal 85 may be facilitated by a network.

At block 204, the transceiver 40 of the server 32 receives the authorization request signal 85, the processor 36 processes the signal utilizing the blockchain application 22 and the data file 51. At block 206, the blockchain application 22 determines the current asset transaction data 52. At block 208 and if the device address 56 recorded as part of the current asset transaction data 52 of a block 50 correlates with signal 85, the blockchain application 22 determines that the human being 28 of the device 26 should be accredited the asset, and thus access should be granted through the door 91 via actuation of the lock assembly 30. To accomplish this, and at block 210, the processor 36 of the server 32 sends a verification signal 87 via the transceiver 40 to the lock assembly 30. At block 212, the processor 55 processes the signal 87 and instructs the lock mechanism 61 to, for example, unlock the door 91. This ability of a human being 28 with the current, or verified, device 26, to unlock the door 91 is the symbolic transference of realestate 90 associated with the access door 91.

The strong verification properties of the blockchain ensure the human being 28 with the current mobile device 26 is the only one able to access the realestate at the current time. In addition to implementing smart lock access as blockchain based assets, the assets may now be governed by smart contracts that can securely automate common realestate or hotel transactions. Smart contracts can trade the ownership of houses between realtors or hotel rooms between guests without any direct interaction between the involved parties. In addition, all lock transactions are stored on the blockchain in a manner that cannot be altered retroactively or forged. Such secure and unalterable smart lock transaction logging can be used to prove the financial value of the house or hotel room.

Figure 7:
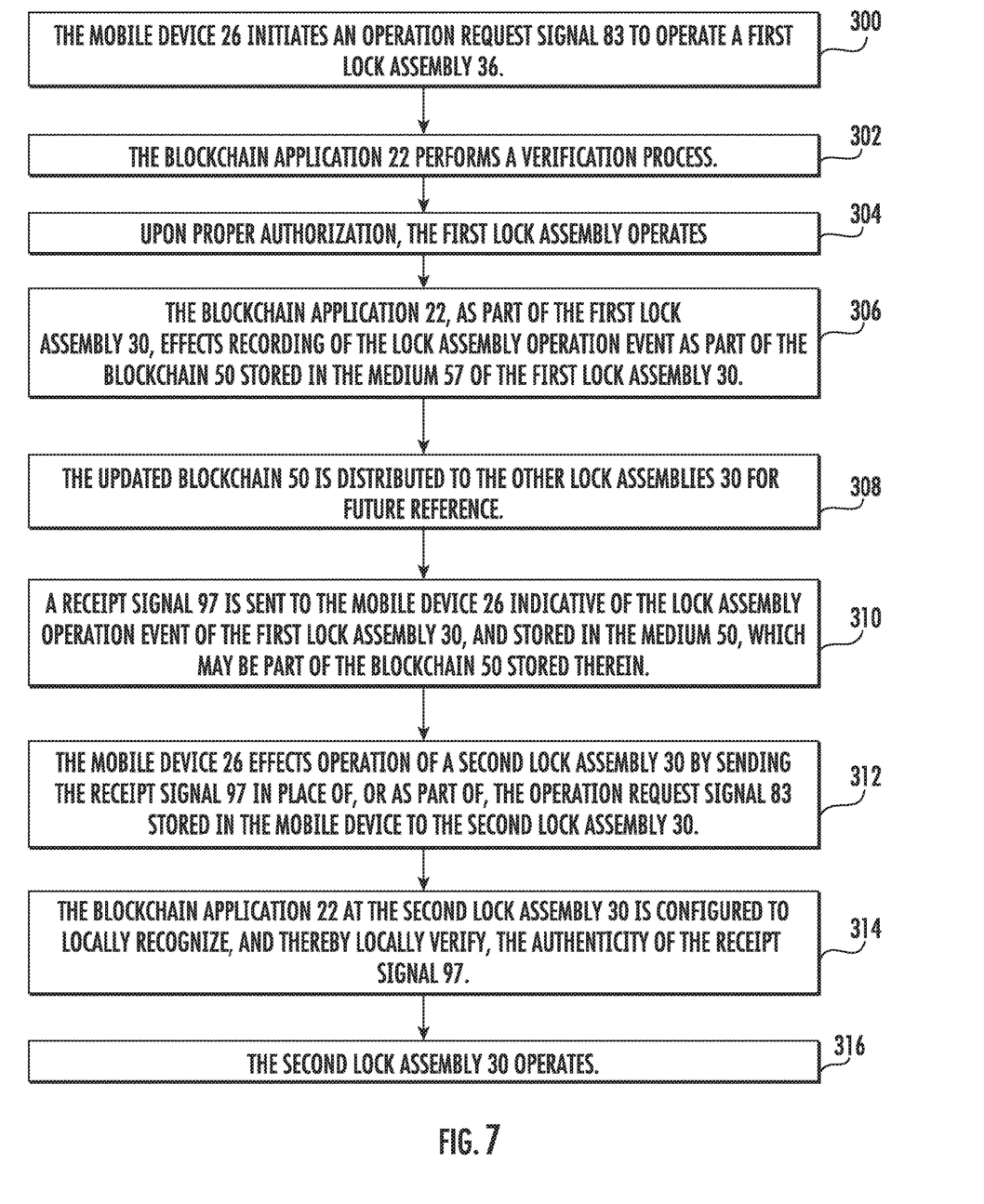
FIG. 7 is a flow chart illustrating another method of operating the system.

Referring to FIG. 7, another embodiment of a method of operating the system 20 is illustrated. As part of this method, at least a portion of the blockchain application 22 and the blockchain 50 is stored in the mediums 57 of each lock assembly 30 and executed by the respective processors 55 (i.e., the distributed ledger). At least a portion of the application 22 and the blockchain 50 may further be stored and executed in the medium 50 and processor 48 of each mobile device 26, and stored and executed in the respective medium 44 and processor 42 of the controller 34. In this embodiment, the blockchain 50 may be distributed directly between lock assemblies 30 as a signal (see arrows 96 in FIG. 1). In this embodiment, the system 20 is configured to reduce the latency associated with operating a lock assembly 30 by delegating "trust" from one lock assembly 30 to another. The blockchain signal 96 may be sent over wireless pathways via the transceivers 46, or may be sent over hard wired pathways.

At block 300, the mobile device 26 carried by, and associated with, a human being 28 initiates an operation request signal 83 to operate (e.g., unlock) a first lock assembly 36. At block 302, the blockchain application 22 performs a verification process. This verification process may include the authorization request signal 85 as previous described. At block 304 and upon proper authorization, the first lock assembly 30 operates (e.g., unlocks) per the request of the mobile device 26. At block 306, the blockchain application 22, as part of the first lock assembly 30, effects recording of this operation event as part of the blockchain 50 stored in the medium 57 of the first lock assembly 30. At block 308, the updated blockchain 50 may be distributed to the other lock assemblies 30 for future reference. At block 310, a receipt signal (see arrow 97 in FIG. 1) is sent to the mobile device 26 indicative of the operating event of the first lock assembly 30, and stored in the medium 50, which may be part of the blockchain 50 stored therein.

At block 312, the human being 28 with the same mobile device 26 of block 300, utilizes the mobile device 26 to operate a second lock assembly 30 by sending the receipt signal 97 in place of, or as part of, the operation request signal 83 stored in the mobile device to the second lock assembly 30 (see FIG. 1). At block 314, the blockchain application 22 at the second lock assembly 30 is configured to locally recognize, and thereby locally verify, the authenticity of the receipt signal 97. At block 316, the second lock assembly 30 operates (e.g. unlocks). In this way, faster verification to unlock the second lock assembly 30 is achieved, on the belief that the human being 28 has authenticated to the first lock assembly 30 successfully, and therefore does not require the presentation of the whole set of credentials a second time (i.e., the verification process). To unlock the second lock assembly 30, only a minimal set of credentials (i.e., the receipt signal 97) is exchanged with the second lock assembly 30, in order to reduce communication latency. This is the meaning of "delegated trust." The blockchain 50 is a record of all operations to ensure trustworthy operations.

Advantages and benefits of the present disclosure include a blockchain based distributed ledger for smart lock systems that provides a verified time stamped authentication receipts, ensuring customers have a high degree of confidence in the security of the system. Other advantages include a digital key that is not easily shared between users through malicious means, or counterfeiting.

The various functions described above may be implemented or supported by a computer program that is formed from computer readable program codes, and that is embodied in a computer readable medium. Computer readable program codes may include source codes, object codes, executable codes, and others. Computer readable mediums may be any type of media capable of being accessed by a computer, and may include non-transitory mediums, Read Only Memory (ROM), Random Access Memory (RAM), a hard disk drive, a compact disc (CD), a digital video disc (DVD), or other forms.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, a software instruction, and/or a computer. It is understood that an application running on a server and the server, may be a component or arrangement. One or more applications may reside within a process and/or thread of execution and an application may be localized on one computer and/or distributed between two or more computers.

While the present disclosure is described with reference to illustrated embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An assignable realestate system comprising:
   at least one processor;
   at least one storage medium;
   a mobile wireless device including a digital key;
   a lock assembly adapted to control access to a realestate;
   a data file stored in the at least one storage medium including a plurality of linked blocks, wherein each one of at least a portion of the plurality of linked blocks include a respective asset transaction data of a plurality of asset transaction data with each one of the plurality of asset transaction data being time stamped;
   a blockchain application stored in the at least one storage medium and executed by the at least one processor, wherein the blockchain application is configured to apply the data file to determine a current asset transaction data of the plurality of asset transaction data and output an authorization signal to the lock assembly associated with the mobile wireless device for access to the realestate based on the current asset transaction data; and an assignment application stored in the at least one storage medium and executed by the at least one processor, the assignment application being configured to accept authorization commands from an administrator and output an asset data signal to the blockchain application for development of the current asset transaction data.

2. The assignable realestate system set forth in claim 1, wherein the asset data signal includes a mobile wireless device address.

3. The assignable realestate system set forth in claim 2, wherein the wireless mobile device includes a key application for the generation of the digital key.

4. The assignable realestate system set forth in claim 3, wherein the digital key is a wireless signal transmitted from the mobile wireless device to the lock assembly, and the wireless signal includes the mobile wireless device address.

5. The assignable realestate system set forth in claim 4, wherein the lock assembly is configured to send an authorization request signal that includes the mobile wireless device address to the blockchain application for authorization verification.

* * * * *